United States Patent
Kakita et al.

(10) Patent No.: US 11,823,262 B1
(45) Date of Patent: *Nov. 21, 2023

(54) FACILITATING AUDIT RELATED ACTIVITIES

(71) Applicant: Wells Fargo Bank, N.A., San Francisco, CA (US)

(72) Inventors: Neil Yoshihisa Kakita, Las Vegas, NV (US); Robert Louis Sellers, San Mateo, CA (US); Abhijit Rao, Irvine, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,191

(22) Filed: Sep. 30, 2022

Related U.S. Application Data

(63) Continuation of application No. 16/007,010, filed on Jun. 13, 2018, now Pat. No. 11,526,935.

(51) Int. Cl.
*G06Q 40/03* (2023.01)
*G06K 19/07* (2006.01)
*G06T 11/60* (2006.01)
*H04N 7/18* (2006.01)

(52) U.S. Cl.
CPC ......... *G06Q 40/03* (2023.01); *G06K 19/0723* (2013.01); *G06T 11/60* (2013.01); *H04N 7/185* (2013.01)

(58) Field of Classification Search
None
See application file for complete search history.

(56) References Cited

U.S. PATENT DOCUMENTS

| | | | |
|---|---|---|---|
| 5,467,271 A | 11/1995 | Abel et al. | |
| 5,922,073 A * | 7/1999 | Shimada | G06F 21/6218 726/6 |
| 8,803,970 B2 | 8/2014 | Weisensale et al. | |
| 9,001,217 B2 | 4/2015 | Kinoshita | |

(Continued)

FOREIGN PATENT DOCUMENTS

| | | | | |
|---|---|---|---|---|
| WO | 2013036233 A1 | 3/2013 | | |
| WO | WO-2013036233 A1 * | 3/2013 | ........... | G06T 19/006 |

(Continued)

OTHER PUBLICATIONS

Blackwell, Mike et al., "An Image Overlay System for Medical Data Visualization," W.M. Wells et al. (Eds.): MICCAI'98, LNCS 1496, pp. 232-240, 1998. @ Springer-Verlag Berlin Heidelberg 1998.

*Primary Examiner* — Paul S Schwarzenberg
(74) *Attorney, Agent, or Firm* — Merchant & Gould P.C.

(57) ABSTRACT

A method for rendering results of an audit includes receiving data corresponding to the results of the audit. The data includes an image to be rendered on a display screen of an electronic computing device. The data includes one or more insights derived from the results of the audit. A user of the electronic computing device is identified. The image is rendered on the display screen. One or more insights derived from the results of the audit are rendered on top of the image on the display screen. A content of the one or more insights derived from the results of the audit that are rendered on top of the image on the display screen is dependent upon the identity of the user of the electronic computing device.

16 Claims, 13 Drawing Sheets

(56) References Cited

U.S. PATENT DOCUMENTS

| | | | |
|---|---|---|---|
| 9,253,198 B2* | 2/2016 | Hughes, Jr. | H04L 63/105 |
| 9,324,171 B2 | 4/2016 | Hicks | |
| 9,380,177 B1 | 6/2016 | Rao et al. | |
| 9,389,425 B2 | 7/2016 | Edwards et al. | |
| 9,424,767 B2 | 8/2016 | Fleck et al. | |
| 9,721,303 B2 | 8/2017 | Combes et al. | |
| 9,767,615 B2 | 9/2017 | Young et al. | |
| 10,007,992 B1* | 6/2018 | Harvey | G06T 7/0002 |
| 10,529,028 B1* | 1/2020 | Davis | G06Q 40/08 |
| 10,937,263 B1* | 3/2021 | Tout | G07C 9/00174 |
| 11,216,890 B1* | 1/2022 | Santos | G10L 15/22 |
| 2002/0177449 A1* | 11/2002 | McDonnell | H04W 60/00 |
| | | | 455/456.1 |
| 2004/0125956 A1* | 7/2004 | Heiderscheit | H04W 4/029 |
| | | | 380/258 |
| 2005/0025235 A1* | 2/2005 | Hoang | H04N 5/765 |
| | | | 375/240.01 |
| 2009/0179916 A1 | 7/2009 | Williams et al. | |
| 2010/0228585 A1* | 9/2010 | Bradley | G06Q 30/018 |
| | | | 705/38 |
| 2012/0264443 A1* | 10/2012 | Ng | H04W 4/70 |
| | | | 455/450 |
| 2013/0311595 A1 | 11/2013 | Milatinovici et al. | |
| 2014/0055489 A1 | 2/2014 | Itkowitz et al. | |
| 2015/0227732 A1* | 8/2015 | Doctor | G06F 21/34 |
| | | | 726/4 |
| 2015/0254738 A1 | 9/2015 | Wright, III et al. | |
| 2016/0247116 A1 | 8/2016 | Olivo et al. | |
| 2016/0284127 A1* | 9/2016 | Rakshit | H04N 21/25866 |
| 2017/0039765 A1 | 2/2017 | Zhou et al. | |
| 2017/0076114 A1* | 3/2017 | Rai | G06F 21/6254 |
| 2017/0206414 A1 | 7/2017 | Schultz et al. | |
| 2018/0262480 A1* | 9/2018 | Doi | G06F 21/6245 |

FOREIGN PATENT DOCUMENTS

| | | | | |
|---|---|---|---|---|
| WO | 2014031899 A1 | 2/2014 | | |
| WO | WO-2014031899 A1 * | 2/2014 | | H04N 21/41407 |
| WO | 2017074611 A1 | 5/2017 | | |
| WO | 2018156506 A1 | 8/2018 | | |
| WO | WO-2018156506 A1 * | 8/2018 | | G06K 9/00637 |

* cited by examiner

FACILITATING AUDIT RELATED ACTIVITIES

BACKGROUND

Audits can be performed for a variety of purposes, including verifying assets used to secure a loan, verifying a possession of documents for security purposes and to conform with compliance regulations. Other types of audits can also be performed.

After the audits are performed, reports can be generated that summarize data obtained from the audits. However, when large amounts of data are obtained as a result of the audits, the reports can be complex and difficult to read and understand.

SUMMARY

Embodiments of the disclosure are directed to a method implemented on an electronic computing device for rendering results of an audit, the method comprising: on the electronic computing device, receiving data corresponding to the results of the audit, the data including an image to be rendered on a display screen of the electronic computing device, the data including one or more insights derived from the results of the audit; identifying a user of the electronic computing device; rendering the image on the display screen; and rendering on top of the image on the display screen the one or more insights derived from the results of the audit, wherein a content of the one or more insights derived from the results of the audit that are rendered on top of the image on the display screen is dependent upon the identity of the user of the electronic computing device.

In another aspect, a method implemented on an electronic computing device for compiling results of an audit comprises: receiving, at the server computing device, audit data from one or electronic devices; processing the audit data received to obtain one or more results of the audit; obtaining an identity of a user to whom at least some of the one or more results is to be displayed; obtaining a current location of the user; and creating content to be rendered on a display device of the user, the content based on the one or more results of the audit, the identity of the user and the current location of the user.

In yet another aspect, an electronic computing device comprises: at least one processor; and system memory, the system memory including instructions which, when executed by the at least one processor, cause the electronic computing device to: receive data corresponding to an audit of a plurality of physical objects, the data including an image to be rendered on a display screen of the electronic computing device, the data including one or more insights derived from results of the audit; identify a user of the electronic computing device; obtain a job title of the user; obtain a current location of the user; render the image on the display screen; and render on top of the image on the display screen the one or more insights derived from the results of the audit and from contextual information derived from a pre-audit of the physical objects and other data regarding the physical objects, wherein a content of the one or more insights that are rendered on top of the image on the display screen is dependent upon the job title of the user and the current location of the user.

The details of one or more techniques are set forth in the accompanying drawings and the description below. Other features, objects, and advantages of these techniques will be apparent from the description, drawings, and claims.

DETAILED DESCRIPTION

Figure 1:
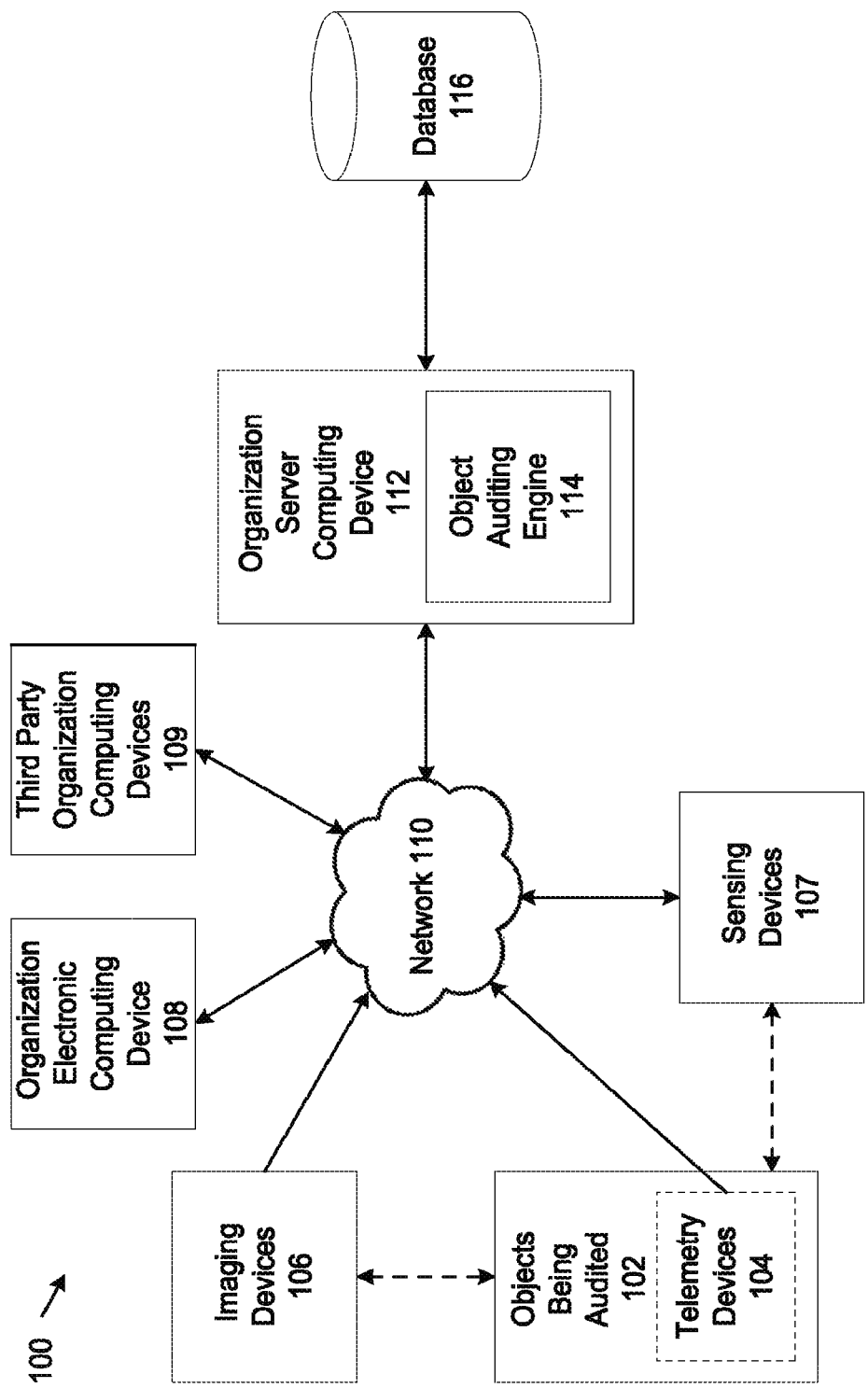
FIG. 1 shows an example system that supports audit related activities.

The present disclosure is directed to systems and methods for using contextual information for audited objects to provide visual summaries of audit data. The visual summaries can simplify reporting of complex audit data. The contextual information can tailor a display of the audit data to specific individuals and to specific locations. In addition, the contextual information can be used to provide potential insights regarding the audit data.

The contextual information can include data such as a name and job title of the specific individuals, information regarding a purpose of an audit and a weighting that can indicate a degree to which sensitive information can be displayed to the specific individuals. The contextual information can also include pre-audit information than can provide a baseline for data obtained during the audit. Other contextual information can be provided, as discussed in more detail later herein.

Audit information can be obtained via imaging devices such as cameras and scanners and via manual input from an auditor. Some or all of the imaging devices can be controlled by the auditor, for example via a smartphone. Some of the imaging devices can be mounted in external devices, such as cameras mounted to building structures and drones that can fly over audited objects and use cameras mounted in the drones to obtain images of the audited objects. In addition, audit information can be obtained via telemetry devices that can be attached to or located near audited objects. The telemetry devices can include radio beacons, radio frequency identification (RFID) devices and global positioning system (GPS) trackers. Other telemetry devices are possible.

In example implementations, one or more insights can be derived from the audit information and from the contextual information. For example, results of the audit can identify one or more physical objects being audited, for example farm equipment. The contextual information can indicate a number of physical objects detected during a pre-audit. An insight can be that one or more of the items of farm equipment are currently missing, damaged, or moved to a different location. The contextual information can also provide information regarding purchased insurance for categories of farm equipment. An insight can be how the purchased insurance for the categories of farm equipment has changed over time. The contextual information can also provide damage estimates for farm equipment or property as a result of an accident, a storm or a fire. An insight can be how a damage estimate compares with an initial estimate of a value for the farm equipment or property.

One example audit that can be performed using the systems and methods can be an asset validation audit. When a loan is obtained from a financial institution to purchase hard assets, for example farm tractors and harvesters, the financial institution has an interest in knowing that the purchased assets are in the possession of the purchaser and have not been damaged. In an example implementation, a drone can fly over a field in which the farm tractors and harvesters are being used. The drone can include a camera that can obtain images of any machinery in the field. In addition, one of more items of purchased equipment can contain radio beacon transmitters that can help identify the purchased assets. The images and telemetry data from the purchased equipment can be analyzed and a determination can be made as to whether the purchased equipment is still in the possession of the purchaser.

Another example audit can be a security audit in which confidential or secret documents can be audited. An auditor using a smartphone can obtain images of documents on an individual's desk or work area, including a file cabinet. Each confidential or secret document can have an identifier, for example a quick response (QR) barcode or RFID imbedded on or attached to the document. When the identifier is scanned using the smartphone, a determination can be made as to whether all required documents can be accounted for.

A third example audit can be a damage assessment audit. For example, a drone can image structures on a farm or other business to assess any damage to the structures as a result of a storm. The images of the structures after the storm can be compared to baseline images to access the damages. Other types of audits are possible.

As discussed in more detail later herein, a report of an audit can be displayed to a user on the user's mobile device, such as a smartphone. Data that is presented in the report can be compiled from the images obtained from the audit, images obtained from a pre-audit and stored contextual information for the audited objects. The data that is presented to the user in the report can be tailored to an authorization level of the user. For example, regarding the damage assessment audit, data presented to a loan executive can include a dollar estimate of a structure loss and an inventor loss. Data presented to a loan officer can include a dollar loss estimate of specific structures, for example structures in a specific area of a farm, rather than an estimate of loss for the entire farm.

The systems and methods disclosed herein are directed to a computer technology that can receive results of an audit of physical objects, derive insights from the results and from contextual information related to the physical objects and display different content regarding the audit based on an identity an identify of an individual who will view the content and a location of the individual. Thus, the systems and method permit a volume of audit data to be analyzed and content to be displayed that is tailored to an individual viewing the content and to where the individual is viewing the content. The systems and method provide efficiencies and enhanced security in displaying a results of an audit because rather than displaying content that may not be meaningful to the individual and that should not be viewed by the individual, the systems and methods can efficiently direct meaningful content to the individual that can be displayed in a secure manner. The display of contextual information tailored to the individual along with audit data of physical objects streamlines complex audit data into a meaningful and efficient presentation on a display screen of an electronic computing device.

FIG. 1 shows an example system 100 that can support audit related activities. System 100 includes objects being audited 102, imaging devices 106, sensing devices 107, an organization electronic computing device 108, third party organization computing devices 109, a network 110, an organization server computing device 112 and a database 116. One or more of objects being audited 102 can include telemetry devices 104. Organization server computing device 112 includes object auditing engine 114. More, fewer, or different components are possible.

The example objects being audited 102 refer to one or more objects than can be audited. The objects can include large assets such as farm machinery, buildings, furniture, electronic equipment and other assets such as documents. The objects can be audited via manual inspection and automatically via visual imaging. More, fewer or different objects can be audited.

The example telemetry devices 104 are electronic devices can identify a location of one or more of the objects being audited 102. The telemetry devices 104 can be attached to or embedded in the one or more objects being audited. Example telemetry devices are radio beacons, RFID devices and GPS trackers. Other telemetry devices 104 are possible.

The example imaging devices 106 are electronic devices that can provide an electronic image of the objects being audited 102. The imaging devices 106 can include cameras that can be physically mounted near the objects being audited 102 or attached to drones, other aircraft or vehicles that can obtain images of the objects being audited 102. The imaging devices 106 can also include scanners and cameras that are contained within portable electronics, such as smartphones. A user of the smartphone can use the scanners and cameras in the smart phone to scan in a document or to take images of the objects being audited 102.

The example sensing devices 107 can be one or more devices that can sense different aspects of the objects being audited 102. Sensing devices 107 can include a global positioning system (GPS) sensor, micro-electro-mechanical (MEMS) sensors, sensors that can detect speech, gestures, and sound and haptic sensors. The MEMS sensors can be one or more of a gyroscope, accelerometer and temperature sensors. The haptic sensors can detect forces, vibrations or motions of the user with respect to a sense of touch. Sensing devices 107 can obtain data related to objects being audited 102 that can determine a current status of the objects being audited 102. More, fewer or different sensing devices 107 can be used.

The example organization electronic computing device 108 is an electronic computing device of an employee of an organization conducting the audit. The employee can use organization electronic computing device 108 to obtain and send contextual information to organization server computing device 112 regarding one or more of objects being audited 102. The contextual information can include pre-audit information and additional information that can insights regarding data obtained during the audit. The organization electronic computing device 108 can include one or more of a desktop electronic computing device, a laptop electronic computing device or a mobile electronic computing device such as a smart phone. The smartphone can include a camera and document scanner software application and can be one of imaging devices 106.

The example third party organization computing devices are typically server computing devices of third party organizations that can provide information pertinent to the audit. For example a third party organization can be an insurance company that can provide data regarding purchased insurance for objects being audited, that can provide damage assessment data for objects being audited that have been damaged by a fire or a storm and that can provide historical information regarding previous damage claims made against the objects being audited. As another example, a third party organization can be an equipment supplier that can provide information regarding a purchase price paid for objects being audited and of a replacement cost for the objects being audited.

The example network 110 is a computer network and can be any type of wireless network, wired network and cellular network, including the Internet. Telemetry devices 104, imaging devices 106 and organization electronic computing device 108 can communicate with organization server computing device 112 using network 110.

The example organization server computing device 112 is a server computer of an organization that can conduct audits for the objects being audited 102. For example, the organization can be hired to perform the audit by another organization that owns the objects being audited 102 or by an organization, for example a financial institution that provided loans to purchase one or more of the objects being audited 102. In another example implementation, the organization can be a government organization that conducts compliance auditing. In still another implementation, the organization can be one that owns one or more of the objects being audited 102 and that is conducting an internal audit. Other example organizations are possible.

The example object auditing engine 114 processes audit data received from imaging devices 106 and telemetry devices 104 and generates one or more reports based on the audit data. The reports can be displayed on a display device, for example as an overlay on an augmented reality device. Object auditing engine 114 can also process contextual information related to the objects being audited 102. The contextual information can include pre-audit information that can be compared with current audit information to determine an audit status. Object auditing engine 114 is described in more detail later herein.

The example database 116 is a database associated with the organization of organization server computing device 112. Database 116 can include a contextual information store. Database 116 can store pre-audit, current audit and contextual information for objects being audited 102. The pre-audit and current information can include such items as identification, location and status information for objects being audited 102. The contextual information can include such items as detailed identification information for the organization and for objects being audited 102 and items such as a purchase date and price and current value for the objects being audited 102, sales data for categories of equipment related to the objects being audited 102, damage assessments and other information. Organization server computing device 112 can store all or parts of the information in database 116. Database 116 can be distributed over a plurality of databases. Organization server computing device 112 can be programmed to query (e.g. using Structured Query Language, SQL) database 116 to obtain the merchant services information.

An example schema including, but not limited to, inventory information stored in database is shown below:

Property ID—a set of letters, numbers or other symbols that uniquely identifies a property at which the objects to be audited 102 are located;

Property name—a name for the property associated with the property ID;

Buildings pointer—a pointer to any buildings at the property associated with the property ID that houses any of the objects to be audited 102.

First building identifier—an identifier for a first building at the property;

Second building name—an identifier for a second building at the property;

Nth building name—an identifier an nth building at the property;

Objects pointer—a pointer to the objects being audited 102.

Record for first object being audited:

Object identifier—a set of letters, numbers or other symbols that uniquely identifies the first object being audited;

Object name—a name for the first object being audited;

Building identifier—an identifier for the building (if any) that houses the first object being audited;

Object location—a description of a where the first object to be audited is physically located;

GPS location—a GPS location of the first object to be audited;

Information block pointer for first object to be audited:

Information block name—a name for the information block for the first object being audited;

Subject-in-action—a name of a person who can view audit data related to the first object being audited;

Marker information—identifiers for a marker that indicates a location for the first object being audited and for a location at which the subject-in-action is permitted to view the audit data related to the first object;

Relevance or trigger—a weighting given to an importance of the audit data for the first object being audited;

Delivery model 1—an identifier for a first delivery model for the first object being audited;

. . .

Delivery model y—an identifier for an yth delivery model for the first object being audited;

Purchase price—a purchase price of the first objected being audited;

Current value—an estimated current value of first object being audited;

Condition status—a description of a current condition of the first object being audited;

Damage estimate—a dollar amount of any damage that may have occurred for the first object being audited;

. . .

Record for nth object being audited:

Object identifier—a set of letters, numbers or other symbols that uniquely identifies the nth object being audited;

Object name—a name for the nth object being audited;

Building identifier—an identifier for the building (if any) that houses the nth object being audited;

Object location—a description of a where the nth object to be audited is physically located;

GPS location—a GPS location of the nth object to be audited;

Information block pointer for nth object to be audited:

Information block name—a name for the information block for the nth object being audited;

Subject-in-action—a name of a person who can view audit data related to the nth object being audited;

Marker information—identifiers for a marker that indicates a location for the nth object being audited and for a location at which the subject-in-action is permitted to view the audit data related to the first object;

Relevance or trigger—a weighting given to an importance of the audit data for the nth object being audited;

Delivery model 1—an identifier for a first delivery model for the nth object being audited;

. . .

Delivery model y—an identifier for a yth delivery model for the nth object being audited;

Purchase price—a purchase price of the nth objected being audited;

Current value—an estimated current value of nth object being audited;

Condition status—a description of a current condition of the nth object being audited;

Damage estimate—a dollar amount of any damage that may have occurred for the nth object being audited;

Report viewing personal pointer—a pointer to records for subjects-in-action authorized to view a report summarizing audit data;

Record for first viewer:

Viewer name—a name of the first viewer;

Viewer title—a job title of the first viewer;

Authorization level—a descriptor indicating a viewing status of the viewer;

The above schema permits the database to be queried for data such data as assets being audited and a current status of these assets.

As an example, the following messaging format can be used between the organization server computing device 112 and the database 116 to obtain status information for a specific property item.

| Property ID | Status |
|---|---|

As an example, the database 116 can use the following messaging format in responding to such a request.

| Property ID | Property Name | Building 1 Name | Building 1 Location | Building 1 Status | Building 2 Name | ... |
|---|---|---|---|---|---|---|

The response message can include the property ID, the property name and information for buildings located on the property. Information for each building can include the building name, the building location and the building status. For example building status can be excellent, good, fair or poor and can include qualifiers such as fire damaged or storm damaged. More, fewer, or different fields can be used. Other examples are possible.

Figure 2:
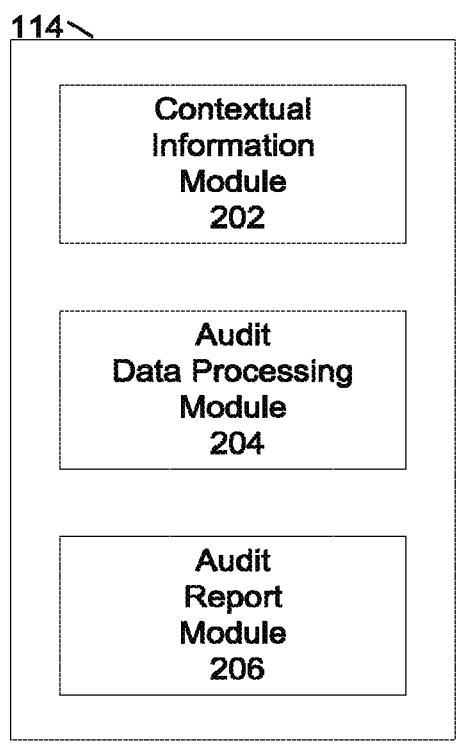
FIG. 2 shows example modules of the object auditing engine of FIG. 1.

FIG. 2 shows example modules of object auditing engine 114. Object auditing engine 114 includes a contextual information module 202, an audit data processing module 204 and an audit report module 206. More, fewer or different modules are possible.

The example contextual information module 202 receives, processes and updates contextual information for the objects being audited 102. The contextual information can include identification information, pre-audit information and current audit information for the objects being audited 102. The identification information can include items such as a name, location, purchase price and purchase date of the objects being audited 102. The pre-audit information can include a status of the objects being audited 102. The status can include a description of a condition of the item during the pre-audit.

The example audit data processing module 204 processes data received as a result of the audit. The data can include imaging data received from cameras or other imaging devices that can be hand-held, hard-mounted or located in drones, aircraft or vehicles, telemetry data received from beacons, object identification information received from RFID devices, and data manually provided by auditors. Audit data processing module 204 can compare data received during an audit with data obtained during a pre-audit and with data obtained from one or more databases. Audit data processing module 204 can then make a determination as to whether any physical objects are missing and a determination regarding a condition of the physical objects being audited.

The example audit report module 206 generates reports from the audit data processed by audit data processing module 204. Audit report module 206 then determines how to present the report to a recipient of the audit. As discussed in more detail later herein, data can be presented in a plurality of ways, including hard copy, on a display screen of an electronic computing device, as an email message or as a text message. The display screen can be a display screen of a conventional display monitor or the display screen of an augmented reality (AR) computing device. Audit report module 206 can also tailor the amount and type of data to be displayed based on an identity of a recipient of the audit. For example, as discussed in more detail later herein, different audit data can be displayed to high-level executives than to lower-level employees, for example sales personnel or loan officers.

Figure 3:
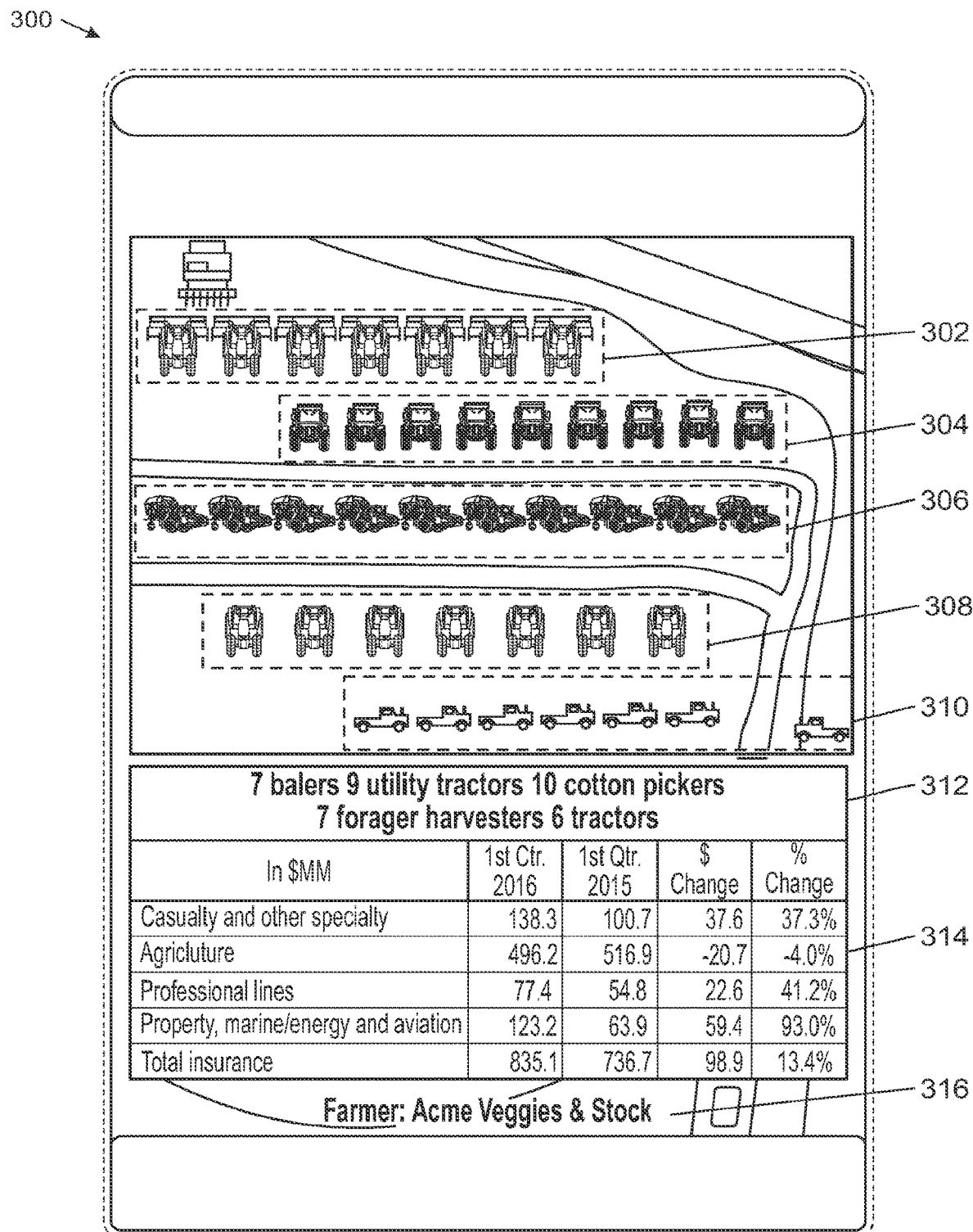
FIG. 3 shows an example graphical user interface of an in-process audit of farm equipment.

FIG. 3 is an example graphical user interface (GUI) 300 from an in-process audit of farm equipment on the farm of an example audited business 316. GUI 300 shows example images of the farm equipment (302-310), an example summary 312 of a result of the audit at a time the GUI 300 was taken, and example statistical information 314 related to the audit. The example audited business is a farm and is indicated as Acme Veggies and Stock.

For FIG. 3, the images of the farm equipment (302-310) are obtained via a camera on a drone that flies over the farm. The camera can be controlled by an operator, for example an individual with a laptop computing device on the farm property. The operator controlling the camera, or a different individual can be on the farm grounds near the equipment and obtain data regarding the farm equipment 302-310 via a radio-frequency identification (RFID) device on one or more pieces of the farm equipment. In addition, one or more pieces of the farm equipment can include telemetry devices, such as global positioning system (GPS) devices or beacons that can identify a location of the farm equipment 302-310.

As shown in FIG. 3, a display of the example farm equipment 302-310 includes balers 302, utility tractors 304, cotton pickers 306, forager harvesters, 308 and tractors 310. Each type of farm equipment 302-310 is shown surrounded by a dotted rectangular box that provides a marker for the type of farm equipment. In addition, GUI 300 includes a summary 312 of a count of the farm equipment 302-310 as determined by an analysis of an image of GUI 300. In an example implementation, the image obtained from the camera(s) on the drone can be sent to an electronic computing device, for example organization server computing device 112. Object auditing engine 114 can determine the different types and number of farm equipment 302-310 from the image and display that information in the summary 312 area of GUI 300. This information can be updated whenever new equipment is detected. As shown in FIG. 3, the current GUI 300 shows in the summary 312 area a total of seven balers, nine utility tractors, ten cotton pickers, seven forager harvesters and six tractors.

GUI 300 also shows example statistical information 314 related to the audit. The statistical information 314 can be obtained from one or more databases, for example database 116, and can provide various types of information. In an example implementation, a user, for example an individual on the farm property can determine what statistical information is to be displayed. As shown in FIG. 3, the statistical information 314 that is displayed includes insurance totals for various categories including casualty and other specialty equipment, agricultural equipment, professional lines, and property, marine/energy and aviation. Also shown are changes for the insurance totals from a first quarter of 2015 to a first quarter of 2016. Other example statistical information 314 is possible.

Figure 4:
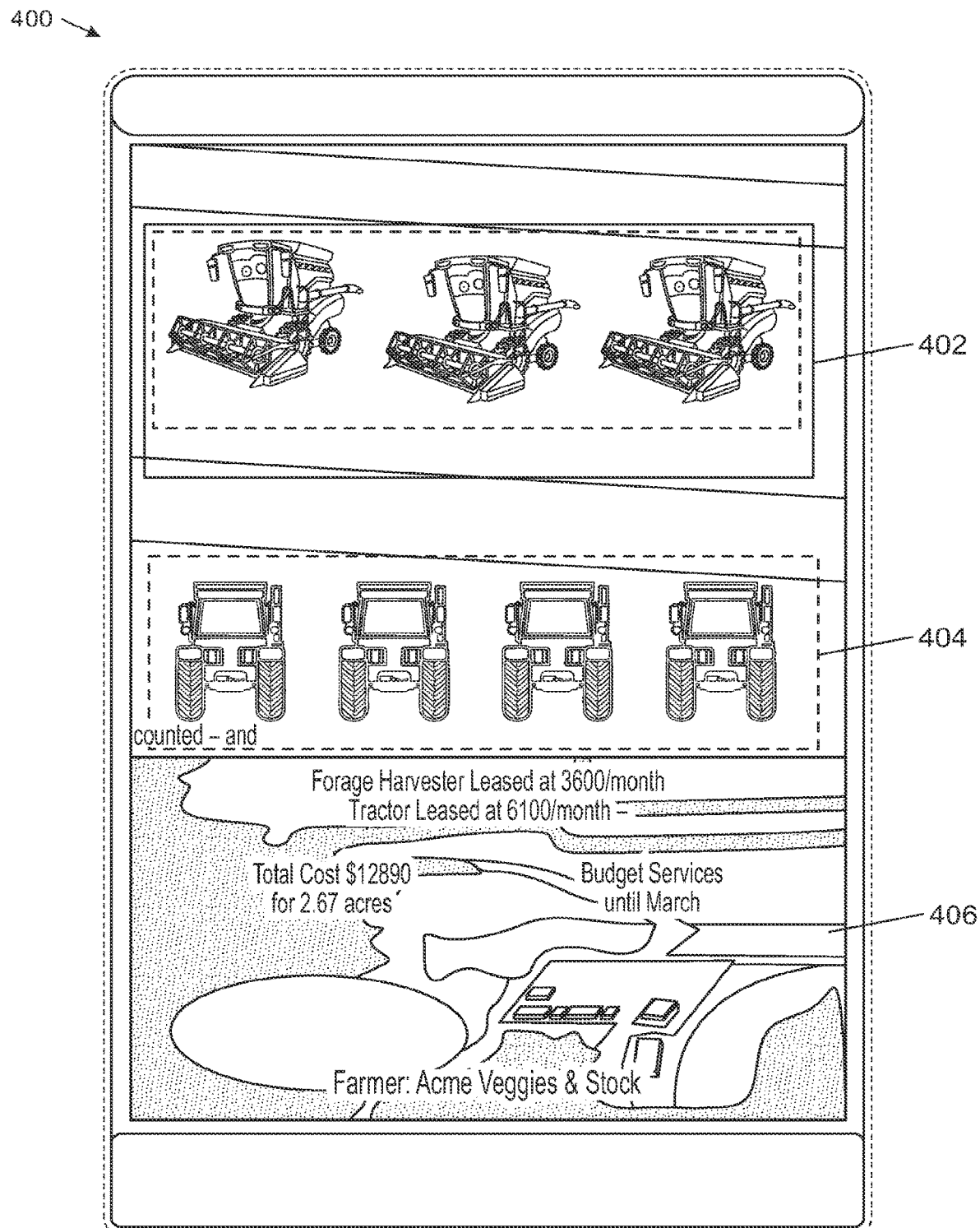
FIG. 4 shows another example graphical user interface of an in-process audit of farm equipment.

FIG. 4 shows and example GUI 400. GUI 400 can be obtained by zooming in on certain equipment with a camera, for example the camera in the drone that obtained GUI 300. Interaction with the camera to obtain the zoom can be accomplished via touch and/or voice and/or gestures. When GUI 400 is obtained using a camera in a smartphone, interaction with the camera can include tilting the smartphone to obtain the desired view.

As shown in FIG. 4, GUI 400 includes a zoom-in of forage harvesters 402 and tractors 404. When organization server computing device 112 obtains an image of GUI 400, object auditing engine 114 can analyze image and determine that the equipment being zoomed in includes forage harvesters and tractors. Using data from an information block that can be stored on database 116, object auditing engine 114 can obtain information regarding the forage harvesters 402 and tractors 404. This information can be displayed in area 406 of GUI 400. As shown in FIG. 4, the displayed information can indicate monthly leasing costs for the forager harvester and tractor equipment and other information. The other information shown includes a total cost of the forager harvester and tractor equipment for 2.67 acres of the Acme Veggies & Stock farm until March. Other information can be displayed in area 406.

Figure 5:
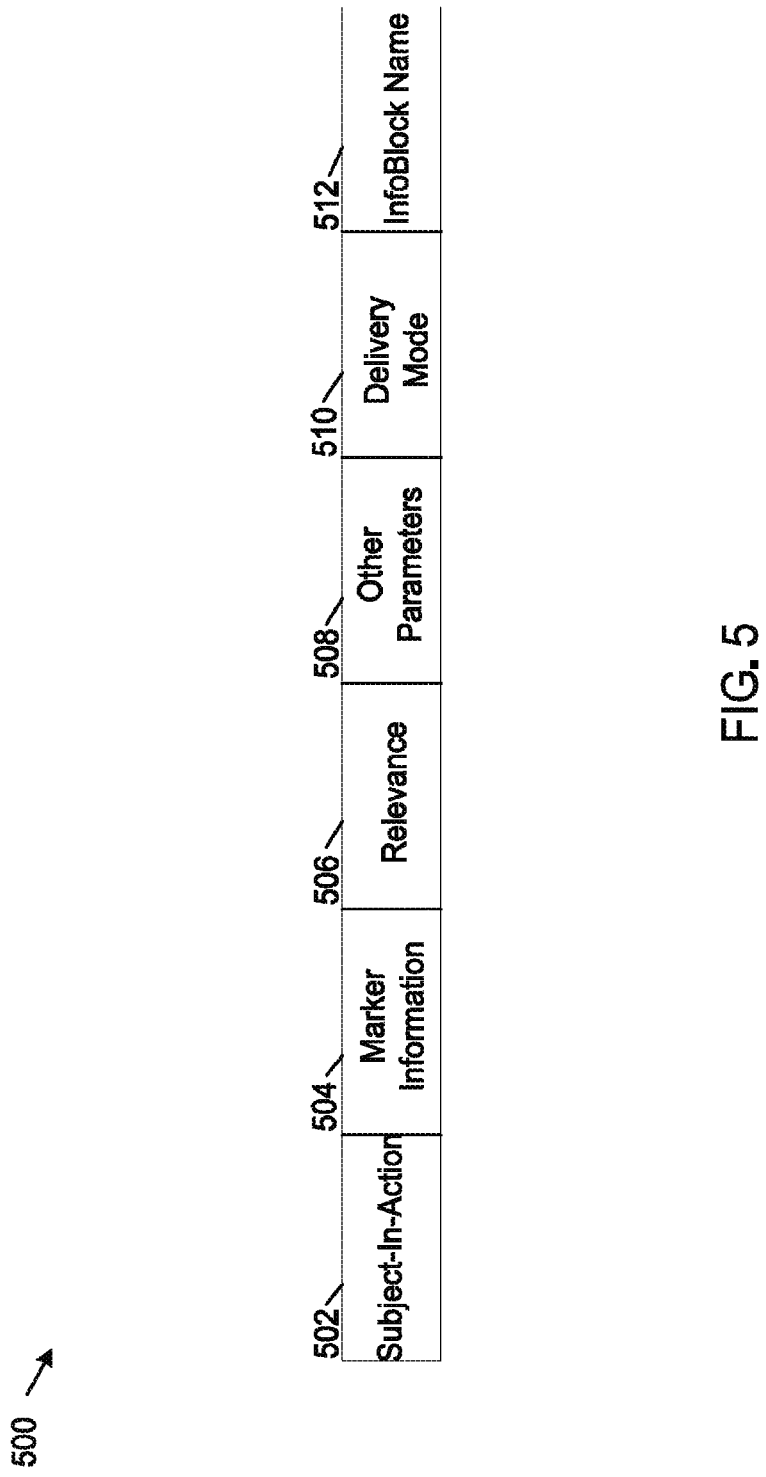
FIG. 5 shows an example schema for an example information block.

FIG. 5 shows an example schema 500 for an information block. A contextual data store that stores contextual information for object auditing engine 114 can comprise a plurality of information blocks. Each information block can include fields for subject-in-action 502, marker information 504, relevance 506, other parameters 508, delivery mode 510 and information block name 512. More, fewer or different fields are possible.

The example subject-in-action 502 field is a text field that identifies a person who can view a visual report of the audit results. The identification typically includes a name and a job title of the person. The job title of the person can define an authorization level that determines a level of detail of the audit results that can be viewed by the person.

The example marker information 504 field is a text field for a marker that can identify a physical object being audited. For example, a document to be audited can contain a red mark that can identify the document. As another example, the marker can comprise one or more items of equipment that are focused on by a camera.

The marker information 504 field can also indicate a location at which the person can view the audit results. The job title of the user and the location at which the user views the audit results can determine the level of detail of the audit results that the person can view at the location. In addition, the marker information 504 field can identify a type of audit information that can be displayed to the person at the location. For example, one type of information that can be displayed can be loan status information.

The example relevance 506 field specifies a weighting for the marker associated with the marker information 504 field. For example, the weighting can be high, medium or low. Other weightings are possible. The weighting can indicate an importance of the marker.

The example other parameters 508 field can indicate a time during which the audit results can be displayed to the person. In some implementation, the other parameters 508 field can be left blank and not used.

The example delivery mode 510 field can specify how the audit results are displayed to the user. Example delivery modes can include a display screen of an augmented reality (AR) device, a text message and whether insights for the audit results are included. Other delivery modes are possible.

The example infoblock name 512 field is a text field that includes a name that identifies the information block.

Table 1, below, is an example of information block data that can be obtained from a contextual information store, for example from database 116. As shown in Table 1, the subject-in-action for the first two rows of table 1 is Joe the CEO. The first row shows that when Joe is in the office, information block data from the "SouthWest/$2 million" information block can be displayed to Joe. The second row shows that when Joe is at the airport, data from a different information block, "SouthWest" can be displayed to Joe. In both locations, the information is displayed on an AR device. The "SouthWest" information block may not include some financial data from the "SouthWest/$2 million" information block viewing audit result data at the airport can be risky from a security standpoint, whereas the financial data can be viewed more securely in Joe's office. For example, a bystander can view the data on the AR display screen at the airport. For all rows in the table "other parameters" aren't used, because in the examples for table 1, there is no time restriction for viewing the audit results.

The red graph marker element refers to an audited document that includes data regarding the southwest account. The document can include a red marker to identify the document to be audited or to identify a section of the document being audited. A graph element can be created by scanning with a camera the section of the document identified by the red marker. The graph element can be combined with contextual information related to the section of the document to form an image for viewing on the AR display screen.

The second from last and the last rows of Table 1 show information block data for an incident (incident_23) in which a loan (loan_1234) is involved. In this example, a loan was taken out to purchase farm equipment and physical structures on the farm, for example a grain bin and water tank, were used to secure the loan (loan_1234). Both the grain bin and the water tank were damaged during a fire (incident 23). The second from last row shows the information block for Sam the Loan Officer, named "Status: Site visit tomorrow 3 PM." The last row shows the information block for Rita the Executive, named "Status" Waiting for field report." The delivery modes for audit reports for both informant blocks is AR device. A description of differences between a display of audit results for both Sam and Rita are discussed with regard to FIGS. 6 and 7, respectively.

TABLE 1

| Subject-In-Action | Marker Information | Relevance | Other Parameters | Delivery Mode | InfoBlockName |
|---|---|---|---|---|---|
| Joe the CEO | Red graph element; Office | High | N/A | AR | "South West/ $2 Million" |
| Joe the CEO | Red graph element; Airport | High | N/A | AR | "South West" |
| Sam the Loan Officer | Loan_1234_status; Incident_23 | High | N/A | AR | "Status: Site visit tomorrow 4 PM" |
| Rita the Executive | Loan_1234_status; Incident_23 | High | N/A | AR | "Status: Waiting for field visit report" |

Figure 6:
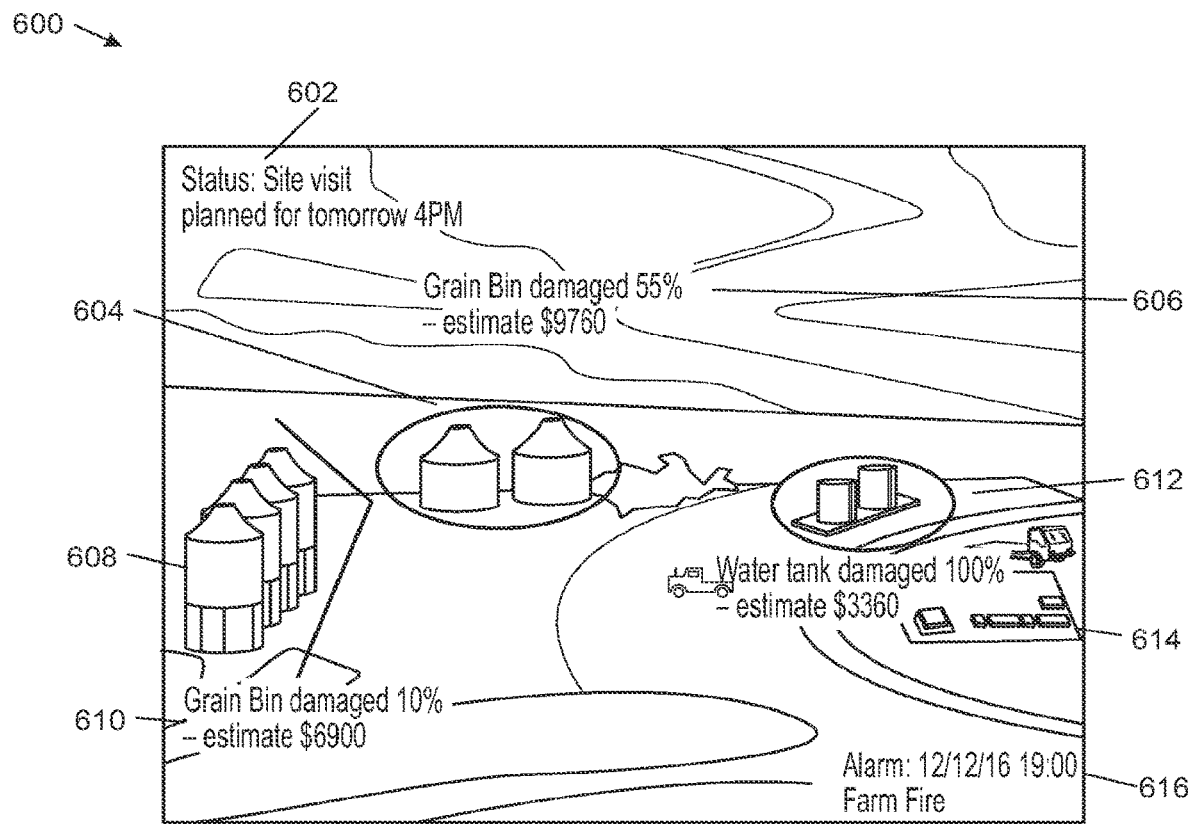
FIG. 6 shows an example graphical user interface showing an audit report.

FIG. 6 shows an example audit report 600 for Sam the Loan Officer that can be displayed on an AR device. Audit report 600 corresponds to the "Status: Site visit tomorrow 4 PM" information block and includes information regarding fire incident 23 that can be displayed to Sam on Sam's AR device. As shown in FIG. 6, the name of the information block 602 ("Status: site visit planned from tomorrow 4 PM) is shown at the top of the audit report 600. Farm buildings shown on the display of audit report 600 include grain bins 604 and 610 and water tank 612. Audit report 600 shows a summary of damage done to these farm buildings as a result of the fire. A summary of damage 606 for grain bin 604 displays "Grain Bin damaged 55% —estimate $9760." A summary of damage 610 for grain bin 608 displays "Grain Bin damaged 10% —estimate $6900." A summary of damage for water tank 612 displays "Water tank damaged 100% —estimate $3360." Audit report 600 includes alarm data 616 regarding the fire, stating "Alarm: 12/12/16 19:00 Farm Fire."

Figure 7:
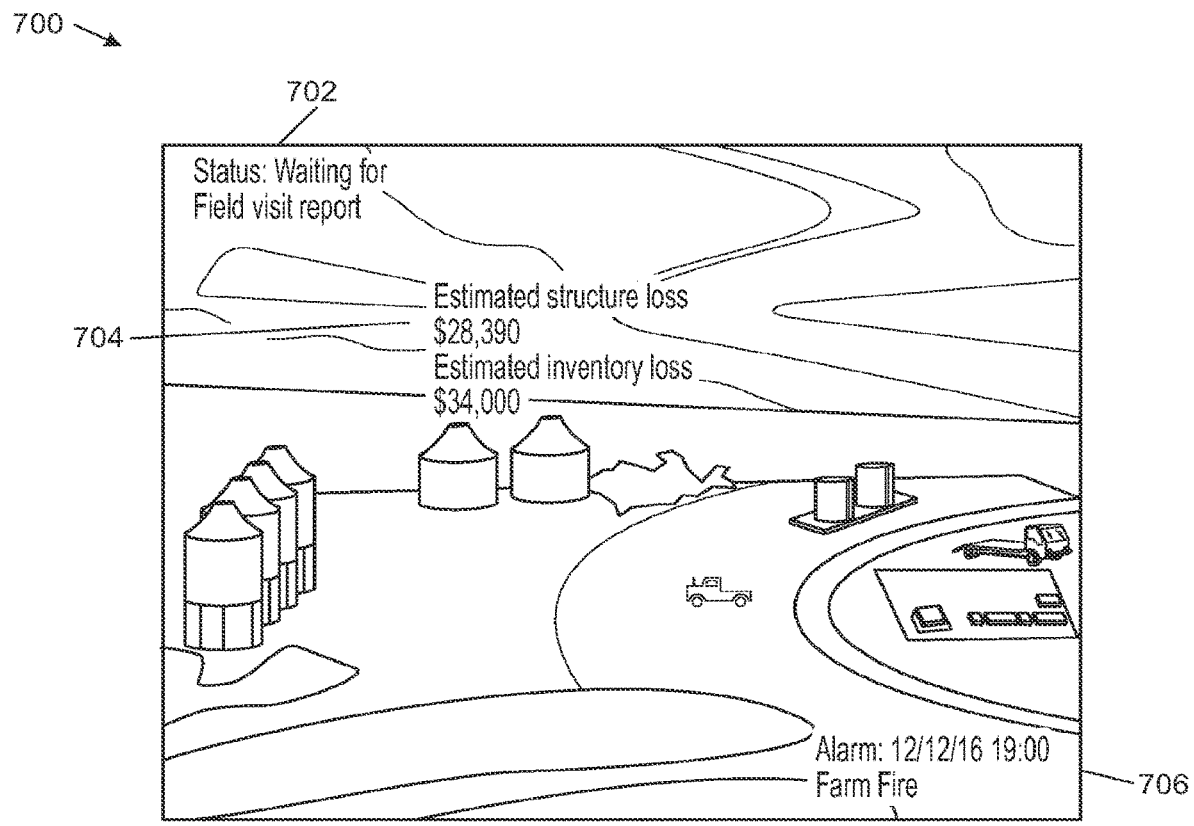
FIG. 7 shows another example graphical user interface showing an audit report.

FIG. 7 shows an example audit report 700 for Rita the Loan Executive that can be displayed on an AR device. Audit report 700 corresponds to the "Status: Waiting for field report" and also includes information regarding fire incident 23 that can be displayed on Rita's AR device. However, as shown in FIG. 7, the information displayed to Rita regarding fire incident 23 is different than that displayed to Sam. Whereas, audit report 600 shows damage amounts for specific physical objects on the farm, audit report 700 for Rita provides an overall damage loss statement 704. The overall damage loss statement 704 indicates an estimated structure loss of $28,390 and an estimated inventory loss of $34,000. Audit report 700 also displays the name 702 of the information block for the audit report—"Status: Waiting for Field visit report" and alarm data regarding the fire, stating "Alarm: 12/12/16 19:00 Fire."

Figure 8:
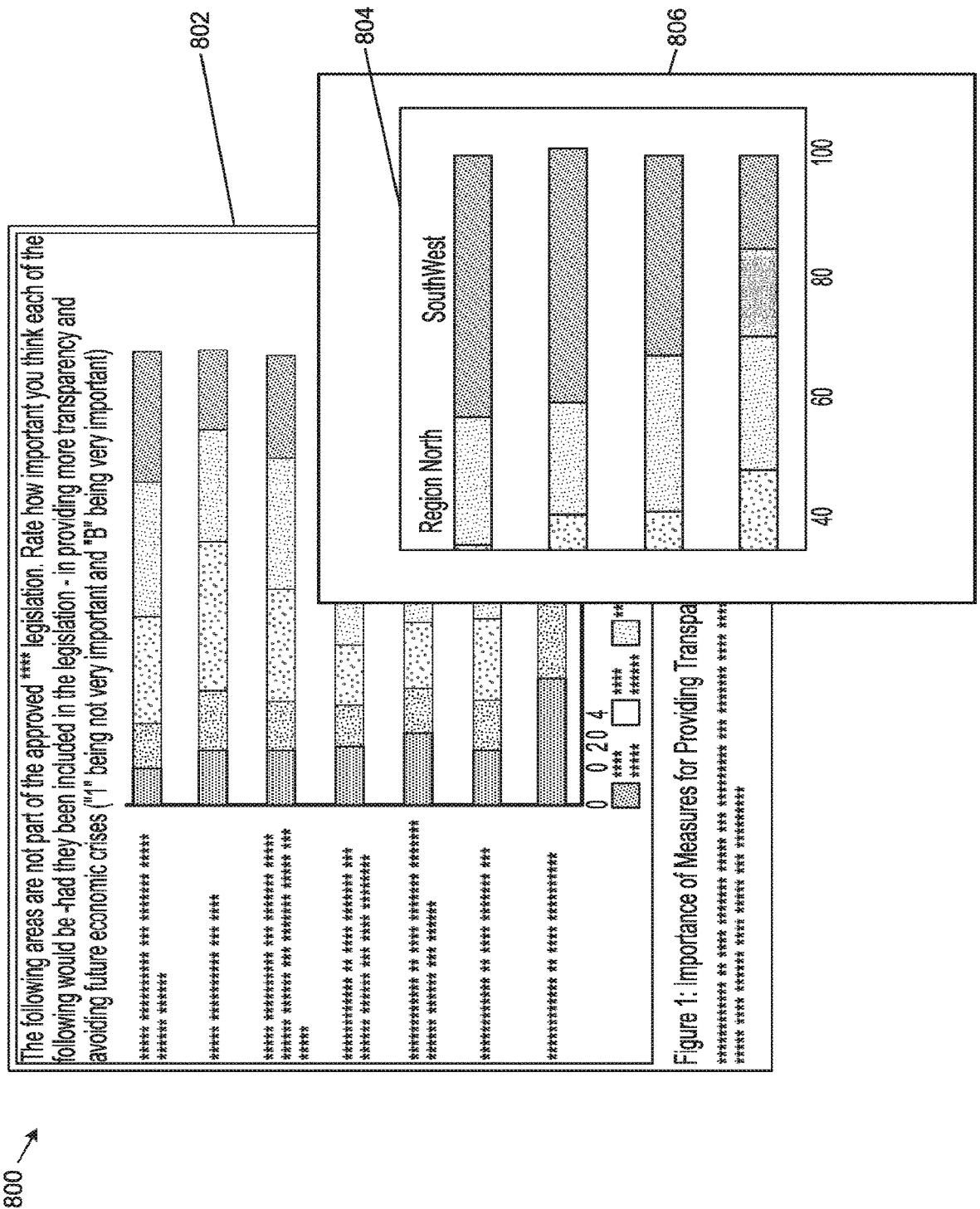
FIG. 8 shows yet another example graphical user interface showing an audit report.

FIG. 8 shows and example audit report 800 that includes a printed report 802 and a focused image 804 of the printed report 802 that can be displayed on an AR device 806. The information block for audit report 800 is shown as "Region North SouthWest" (based on a marker in view on printed report 802). The marker corresponds to content on printed report 802. The AR device 806 is positioned over the marker to display the focused image 804 of the printed report 802.

Figure 9:
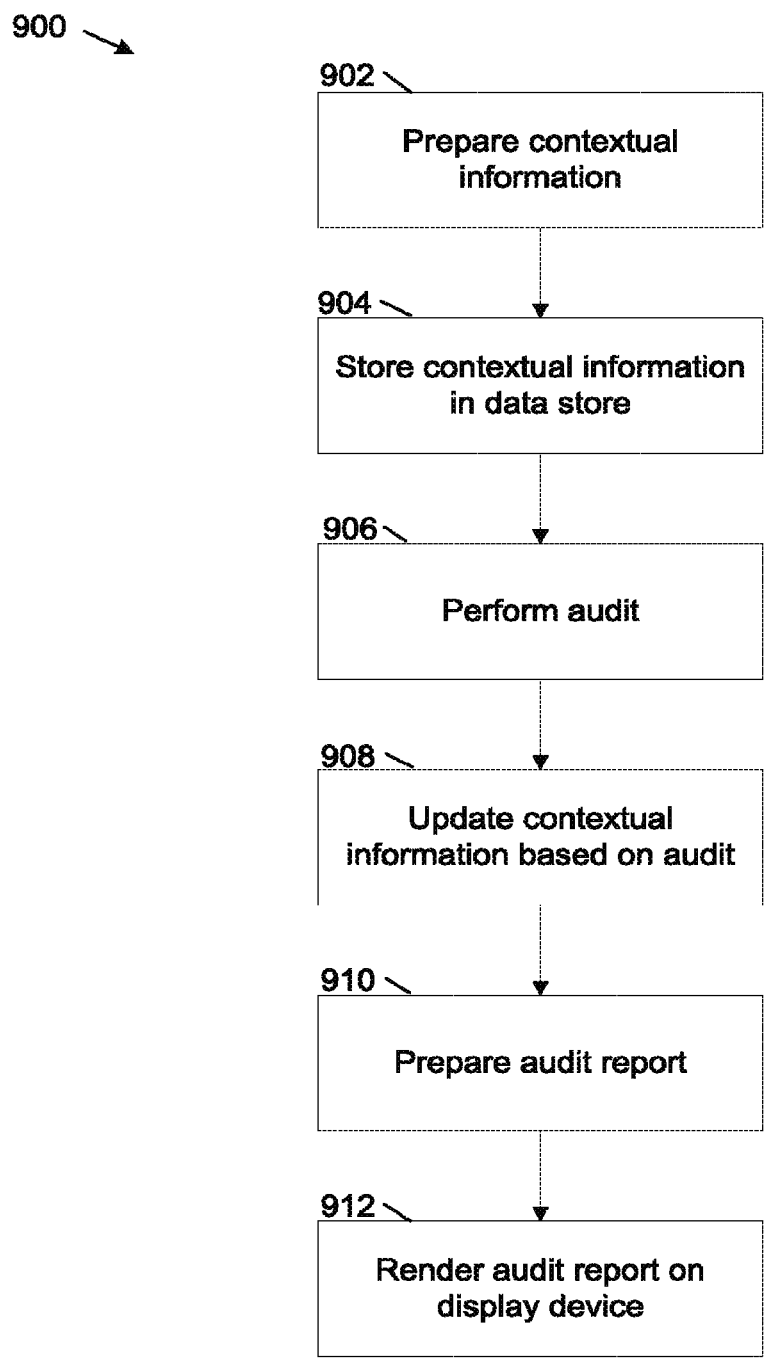
FIG. 9 shows an example flowchart for conducting an audit.

FIG. 9 shows a flowchart for an example method 900 for conducting an audit of a plurality of assets of an organization. The assets can be physical assets such as buildings, equipment and livestock. The assets can also be soft assets such as documents. Method 900 provides for obtaining contextual information regarding the assets, performing the audit, tailoring audit data to a specific individual at a specific location and rendering the tailored audit data on a display device.

At operation 902, contextual information is prepared for the audit. The contextual information can include known data regarding the audit, such as a name of a property, identification, price, current condition, insurance and other descriptive information regarding physical structures on the property, identification of documents to be audited, GPS location information and other items. The contextual information can also include information from a pre-audit of the assets on the property. The pre-audit information can include a count of the assets, a current condition of the assets and a physical location of the assets. Other contextual information is possible.

At operation 904, the contextual information is stored in a data store. For method 900 the data store is database 116.

At operation 906, an audit is performed for the assets of the property. The audit determines a current status of the assets. A detailed description of the audit is provided later herein, with regard to FIG. 10.

At operation 908, the contextual information stored in database 116 is updated as a result of the audit. Example updates can include changes in a number of the assets, for example reflecting whether any of the assets are missing, changes of location of the assets and changes in the physical condition of the assets, for example due to damage from storms or fire.

At operation 910, an audit report is prepared from data obtained from the audit. The audit report summarizes the results of the audit. The audit report can be tailored to an individual who is to view the report. A more detailed description of operation 910 is provided with regard to FIG. 11.

At operation 912, the audit report is rendered on a display device. For method 900, the display device is an augmented reality (AR) display device. The content of the audit report that is rendered on the display device is dependent on the job title of the individual who is to view the audit report and to a current location of the individual. In some implementations, the content is also dependent on the time of day in which the audit report is to be viewed. A more detailed description of operation 910 is provided with regard to FIG. 12.

Figure 10:
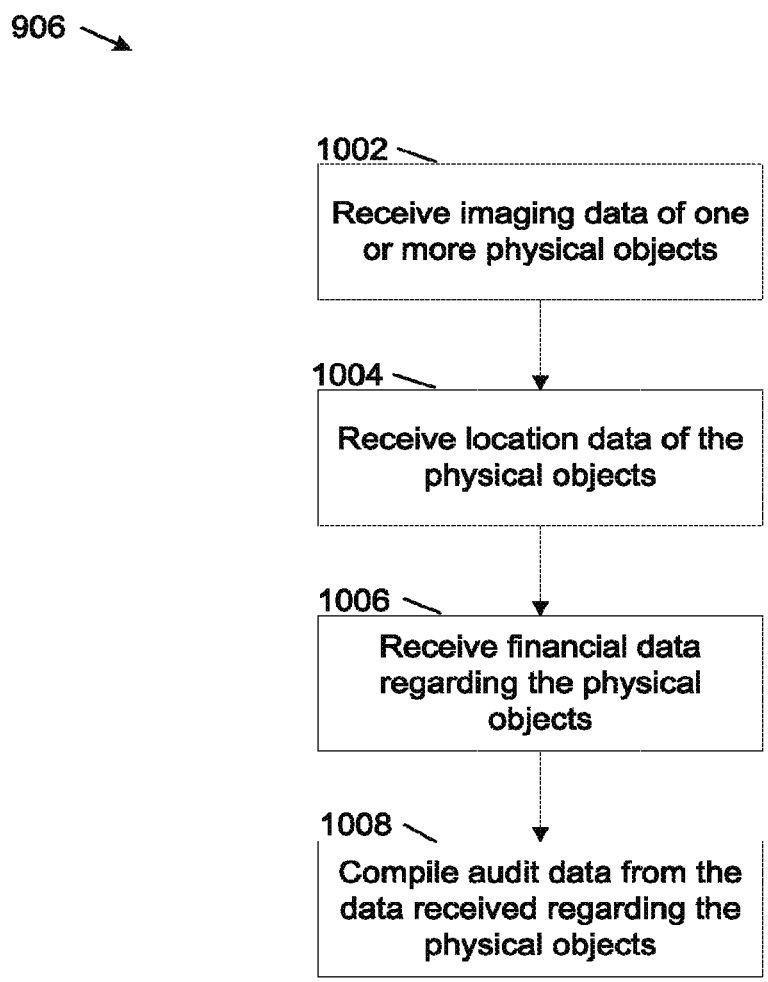
FIG. 10 shows an example flowchart of an operation the flowchart of FIG. 9.

FIG. 10 is an example flowchart of operation 906 of FIG. 9, which describes performing an audit.

At operation 1002, imaging data is received of one or more physical objects being audited. The physical objects can be structural assets such as buildings, farm silos, water tanks, desks, chairs, tables and file cabinets, equipment such as electronic equipment, farm machinery, and vehicles, and other assets such as documents and books. The imaging data can be received from one or more cameras that are physically mounted near the equipment, from hand-held cameras, such as stand-alone cameras or cameras that are included in a smartphone and from cameras mounted in vehicles or aircraft such as drones. The cameras can focus on individual physical objects or groups of physical objects.

At operation 1004, location data of the physical objects is received. For some objects, the location data can be obtained from a GPS location of the object. The GPS location of the object can be obtained using GPS software on an electronic device, such as a smartphone, near the object, for example on a smartphone camera that is used to photograph an image of the object or a smartphone carried by an individual near the object. For other objects, the location data can be obtained from a telemetry device, such as a beacon, located on or near the object. For other objects, the location data can be obtained from GPS software on an aircraft, such as a drone, flying over the object, on a vehicle near the object.

At operation 1006, financial data is received regarding the physical objects. The financial data can be obtained from the contextual information data store or from data obtained from or derived from data obtained from the audit. For example, the contextual information store can have data such as an estimated value of the asset and a dollar amount for which the object is insured. As another example, when image data of the object obtained from the audit shows that the object has been damaged due to a storm or fire, an estimate of a dollar amount of the damage can be made and obtained from the contextual information data store. For example, an insurance claim could have been filed and results from a damage assessment could have been stored in the contextual information data store.

At operation 1008, audit data is compiled from the data received from the physical objects. The audit data can include such information as a current status of the physical object, for example whether the physical object can be found, a current condition status of the physical object, and a current location of the physical object. The audit data can be stored in the contextual information store.

Figure 11:
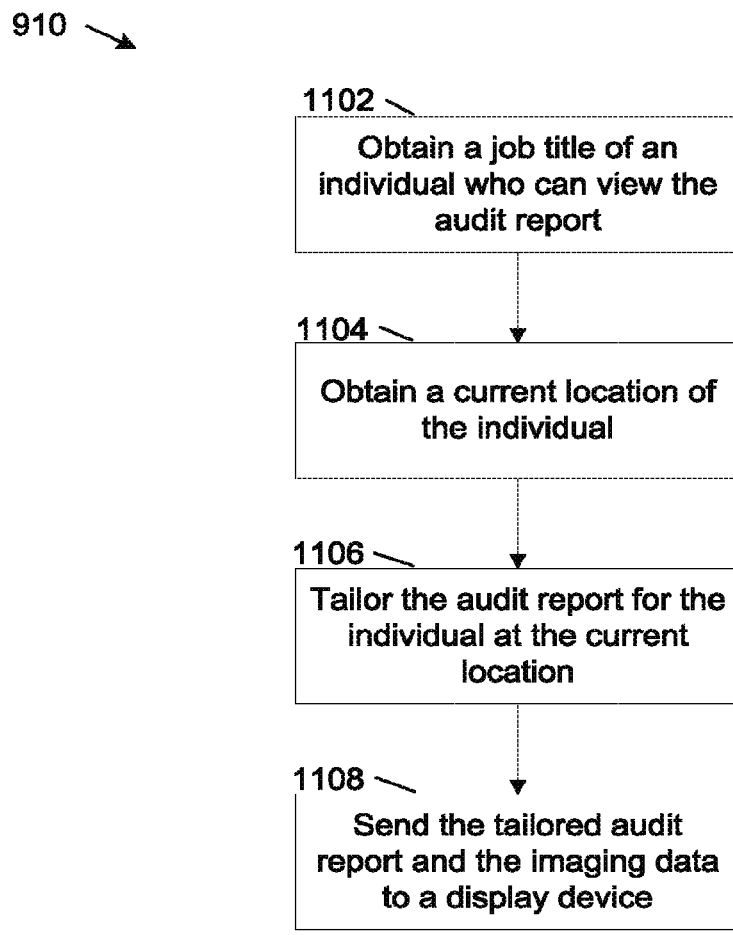
FIG. 11 shows an example flowchart of another operation the flowchart of FIG. 9.

FIG. 11 is an example flowchart of operation 910 of FIG. 9, which describes preparing an audit report. The audit report can include the current status of the physical object and other information obtained from the contextual information store, such as a current value of the object and insurance coverage for the object. In addition, other information from the contextual information store can be included, such as news related to storm or fire damage or when a next inspection of the property is to occur.

At operation 1102, a job title of an individual who can view the audit report is obtained. The job title can be obtained from the contextual information store. As discussed earlier herein, the job title can determine a level of detail that can be included in the audit report for the individual.

At operation 1104, a current location of the individual is obtained. The current location can be obtained, for example, via GPS software on a smartphone of the individual. As discussed earlier herein, the current location of the individual, in conjunction with the job title can determine the level of detail that can be included in the audit report for the individual.

At operation 1106, the audit report is tailored for the individual at the current location. Different levels of detail can be provided depending on the current location of the individual. For example, some information that can be displayed to the individual in the individual's office may not be displayed in a public place, such as an airport, for security reasons.

At operation 1108, the tailored audit report is sent to an electronic computing device, for example a smartphone or a laptop computer of the individual to be displayed on a display screen of the electronic computing device. In example implementation, audit report data is rendered in augmented reality on the display screen of the smartphone. In some implementations, information regarding where to render the data from the audit report on the electronic device is also sent to the electronic computing device.

Figure 12:
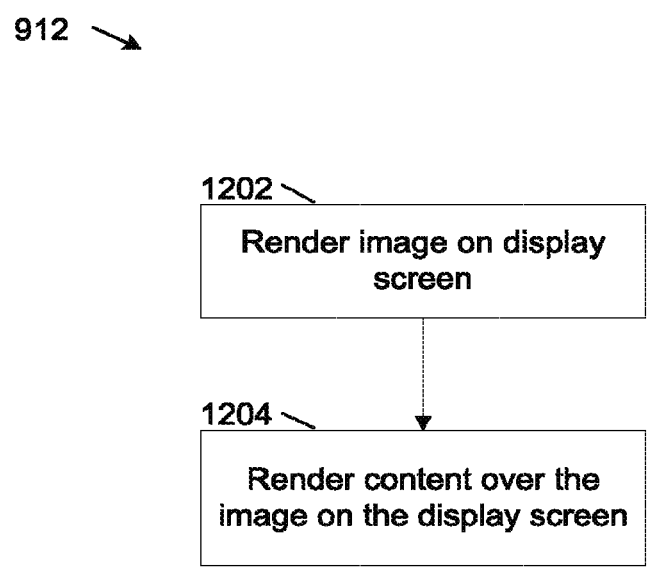
FIG. 12 shows an example flowchart of yet another operation the flowchart of FIG. 9.

FIG. 12 is an example flowchart of operation 912 of FIG. 9, which describes rendering an audit report on a display device.

At operation 1202, an image is rendered on the display screen of the display device. The image is typically one related to the audit. For example, the image can be one of a physical property and can show one or more buildings on the physical property. An example of such an image is shown in FIG. 6. The image can also be one of a document, for example as shown in FIG. 8. The image can include a graph element created by scanning a section of the document identified by a marker. Other images are possible.

At operation 1204, content from the audit report is rendered over the image on the display screen. As shown in the example of FIG. 6, damage assessment data from the audit report is rendered over the background image. In this example, additional content from the audit report, such as a status of a planned site visit and time and date of a farm fire are also rendered over the background image.

Figure 13:
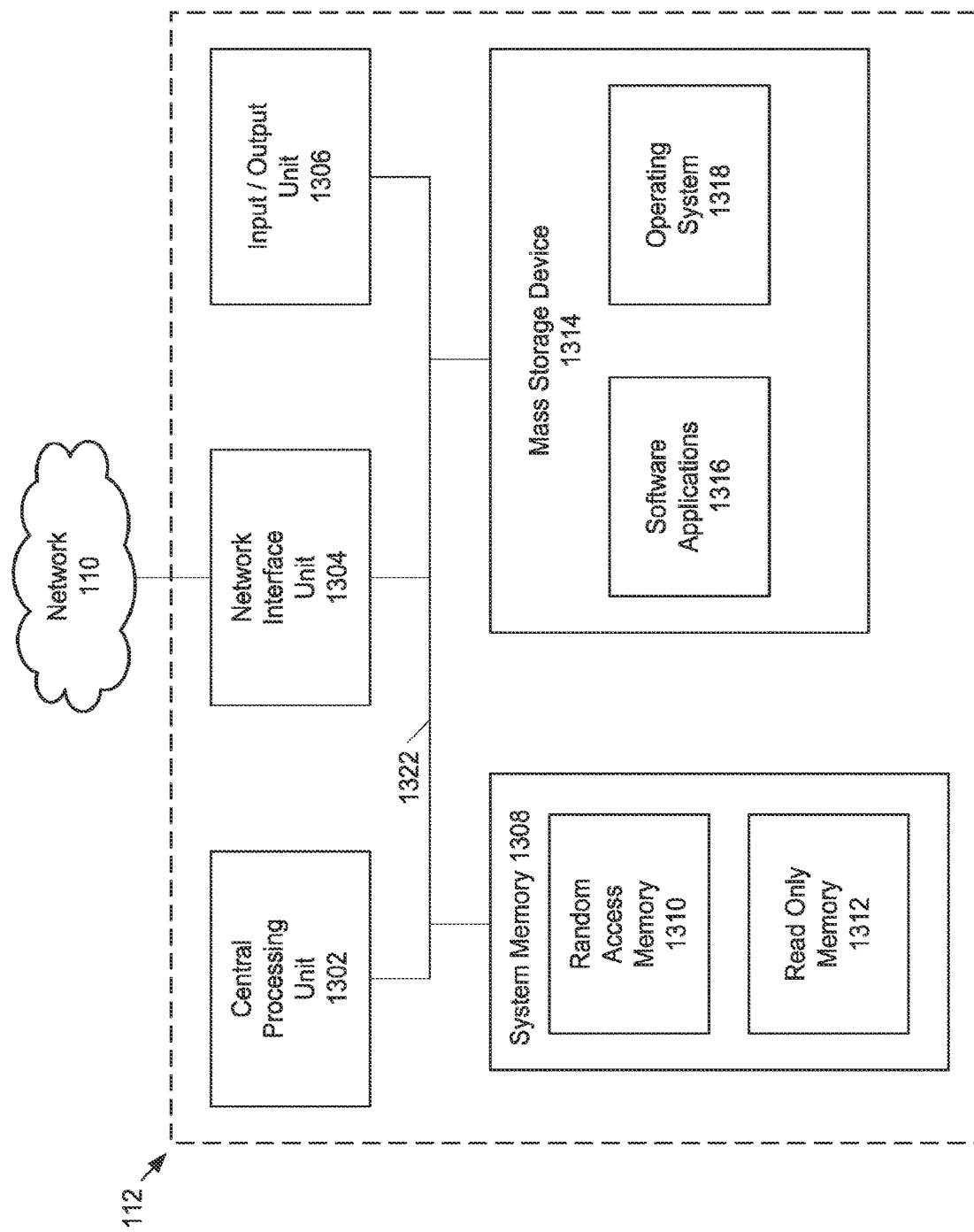
FIG. 13 shows example physical components of the organization server computing device of the system of FIG. 1.

As illustrated in the example of FIG. 13, organization server computing device 112 includes at least one central processing unit ("CPU") 1302, also referred to as a processor, a system memory 1308, and a system bus 1322 that couples the system memory 1308 to the CPU 1302. The system memory 1308 includes a random access memory ("RAM") 1310 and a read-only memory ("ROM") 1312. A basic input/output system that contains the basic routines that help to transfer information between elements within the organization server computing device 112, such as during startup, is stored in the ROM 1312. The organization server computing device 112 further includes a mass storage device 1314. The mass storage device 1314 is able to store software instructions and data. Some or all of the components of the organization server computing device 112 can also be included in organization electronic computing device 108.

The mass storage device 1314 is connected to the CPU 1302 through a mass storage controller (not shown) connected to the system bus 1322. The mass storage device 1314 and its associated computer-readable data storage media provide non-volatile, non-transitory storage for the organization server computing device 112. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization server computing device 112.

According to various embodiments of the invention, the organization server computing device 112 may operate in a networked environment using logical connections to remote network devices through the network 110, such as a wireless network, the Internet, or another type of network. The organization server computing device 112 may connect to the network 110 through a network interface unit 1304 connected to the system bus 1322. It should be appreciated that the network interface unit 1304 may also be utilized to connect to other types of networks and remote computing systems. The organization server computing device 112 also includes an input/output controller 1306 for receiving and processing input from a number of other devices, including a touch user interface display screen, or another type of input device. Similarly, the input/output controller 1306 may provide output to a touch user interface display screen or other type of output device.

As mentioned briefly above, the mass storage device 1314 and the RAM 1310 of the organization server computing device 112 can store software instructions and data. The software instructions include an operating system 1318 suitable for controlling the operation of the organization server computing device 112. The mass storage device 1314 and/or the RAM 1310 also store software instructions and software applications 1316, that when executed by the CPU 1302, cause the organization server computing device 112 to provide the functionality of the organization server computing device 112 discussed in this document. For example, the mass storage device 1314 and/or the RAM 1310 can store software instructions that, when executed by the CPU 1302, cause the organization server computing device 112 to display received data on the display screen of the organization server computing device 112.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a server computing device for compiling one or more results of an audit of one or more physical objects, the method comprising:
receiving, at the server computing device, audit data from one or more electronic devices;
processing the audit data received to obtain the one or more results of the audit and one or more insights derived from the one or more results;
obtaining, via a global positioning sensor on an electronic computing device, a current location of a user to whom at least some of the one or more results is to be displayed via a display screen on the electronic computing device;
determining a security level of the current location of the user;
creating content for an audit report to be displayed on the display screen of the electronic computing device including a monetary estimate of a current value of the one or more physical objects, the content based on: the one or more insights derived from the one or more results of the audit, and the security level of the current location of the user, wherein a level of detail of the one or more insights that is included in the audit report is dependent upon the security level of the current location of the user of the electronic computing device, wherein the level of detail of the one or more insights included in the audit report includes additional financial data when the current location of the user of the electronic computing device is secure; and
sending the audit report, including an image of the one or more physical objects being audited, to the electronic computing device for the electronic computing device to render the image on the display screen of the electronic computing device and the one or more insights as an overlay on top of the image in augmented reality.

2. The method of claim 1, wherein the image is comprised of one or more graph elements of the one or more physical objects being audited.

3. The method of claim 1, further comprising deriving the one or more insights by supplementing the one or more results of the audit with contextual information.

4. The method of claim 1, further comprising:
receiving an authorization level of the user of the electronic computing device, wherein the authorization level is defined by a role of the user.

5. The method of claim 4, wherein the level of detail of the one or more insights that is included in the audit report is further dependent on the authorization level of the user.

6. The method of claim 1, wherein the one or more results of the audit include data relating to damage due to a storm or a fire.

7. The method of claim 6, wherein the one or more results of the audit include data related to insurance coverage for assets.

8. The method of claim 1, wherein the electronic computing device is an augmented reality (AR) device.

9. The method of claim 1, wherein the one or more electronic devices include one or more of a camera, a radio frequency identification (RFID) device, a telemetry device and a mobile electronic computing device.

10. The method of claim 1, wherein receiving, at the server computing device, the audit related data from the one or more electronic devices, further comprises:
receiving one or more images of one or more physical objects being audited; and
receiving telemetry data from the one or more physical objects being audited.

11. A server computing device for compiling results of an audit of one or more physical objects, the server computing device comprising:
at least one processor; and
system memory, the system memory including instructions which, when executed by the at least one processor, cause the server computing device to:
receive, at the server computing device, audit data from one or more electronic devices;

process the audit data received to obtain one or more results of the audit and one or more insights derived from the one or more results;

obtain, via a global positioning sensor on an electronic computing device, a current location of a user to whom at least some of the one or more results is to be displayed via a display screen on the electronic computing device;

determine a security level of the current location of the user; and create content for an audit report to be displayed on the display screen of the electronic computing device including a monetary estimate of a current value of the one or more physical objects, the content based on: the one or more insights derived from the one or more results of the audit and the security level of the current location of the user, wherein a level of detail of the one or more insights that is included in the audit report is dependent upon the security level of the current location of the user of the electronic computing device, wherein the level of detail of the one or more insights included in the audit report includes additional financial data when the current location of the user of the electronic computing device is secure; and send the audit report, including an image of the one or more physical objects being audited, to the electronic computing device for the electronic computing device to render the image on the display screen of the electronic computing device and the one or more insights as an overlay on top of the image in augmented reality.

12. The server computing device of claim 11, wherein the instructions, when executed by the at least one processor, further cause the server computing device to:
derive the one or more insights by supplementing the one or more results of the audit with contextual information.

13. The server computing device of claim 11, wherein the instructions, when executed by the at least one processor, further cause the server computing device to:
receive an authorization level of the user of the electronic computing device, wherein the authorization level is defined by a role of the user.

14. The server computing device of claim 13, wherein the level of detail of the one or more insights that is included in the audit report is further dependent on the authorization level of the user.

15. The server computing device of claim 11, wherein the electronic computing device is an augmented reality (AR) device.

16. The server computing device of claim 11, wherein receiving, at the server computing device, the audit related data from the one or more electronic devices, further comprises:
receiving one or more images of the one or more physical objects being audited; and
receiving telemetry data from the one or more physical objects being audited.

* * * * *